United States Patent Office 2,845,425
Patented July 29, 1958

2,845,425

SUBSTITUTED AMINOPYRIMIDINES

Calvert W. Whitehead and John J. Traverso, Indianapolis, Ind., assignors to Eli Lilly and Company, Indianapolis, Ind., a corporation of Indiana No Drawing. Application October 4, 1956
Serial No. 613,845

6 Claims. (Cl. 260—256.4)

This application relates to substituted pyrimidines and more particularly to certain novel 4-amino-6-substituted aminopyrimidines and acid addition salts thereof.

The bases of the compounds which are included within the scope of our invention can be represented by the following structural formula

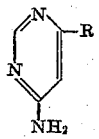

wherein R represents a member of the group consisting of alkylamino radicals having from 4 to 7 carbon atoms, and anilino, p-toluidino, m-toluidino, β-phenoxyethylamino, benzylamino, p-chlorophenylamino, γ-phenyl-n-propylamino, m-methylbenzylamino, phenethylamino, cyclohexylamino, phenylsulfonylamino, α-furfurylamino, N-piperidino and β-pyridylmethylamino radicals.

The new compounds of the invention are effective diuretics when they are administered orally to mammals. They exhibit their physiological activity in relatively low doses and with relatively few side effects or toxic reactions.

The 4-amino-6-substituted aminopyrimidines of the invention are conveniently prepared by condensing a 4-amino-6-halopyrimidine, for example 4-amino-6-chloropyrimidine or 4-amino-6-bromopyrimidine, with a selected substituted amine to form a pyrimidine substituted in the 6-position with one of the radicals mentioned hereinabove. Because the compounds contain nitrogen atoms which are capable of combining with acids to form acid addition salts, treating any of the pyrimidines of our invention with an acid results in the formation of an acid addition salt of that compound, which has somewhat different physical properties but retains the desired diuretic action of the pyrimidine base from which it is formed. Methods for the preparation of such salts include methods known to the art, such as the interreaction of equivalent amounts of the selected base and an acid in a mutual, inert solvent solution, followed by removal of the solvent. Similarly, an equivalent amount of the acid can be added to a solution of the base in an organic solvent in which the salt is insoluble, whereupon the acid addition salt of the pyrimidine base employed precipitates from solution and is isolated by filtration. The acids which are preferred for preparing acid addition salts of the novel pyrimidines of the invention are the pharmaceutically useful acids. By the term "pharmaceutically useful acids" it is intended to designate those acids which do not materially increase the toxicity of the pyrimidine bases from which they are derived, but which are useful for incorporating the compounds into pharmaceutical preparations by virtue of their solubility or other physical properties. Examples of pharmaceutically useful acids are hydrochloric, phosphoric, nitric, acetic, propionic, citric, maleic, salicylic and the like acids.

The bases of the 4-amino-6-substituted aminopyrimidines of the invention are white, crystalline solids which are soluble in organic solvents and relatively insoluble in water. Their acid addition salts are crystalline solids which are water-soluble but generally less soluble in most organic solvents.

For use, the novel compounds of the invention can be employed as such, but are preferably incorporated into a pharmaceutical vehicle, suitable for oral administration, e. g., individual dose amounts of 10 to 100 mg. being employed. For example, the selected compound can be mixed with a solid pharmaceutical extending medium or excipient and formed into tablets, pills, placed in capsules, packaged as powders or the like. Alternatively, the compounds can be dispersed in a liquid pharmaceutical extending medium, to form elixirs, tinctures, aqueous suspensions and the like. Likewise the compounds can be injected parenterally, for example, by dissolving an acid addition salt of the selected compound in a sterile aqueous pharmaceutical diluent, or dispersing the compounds in sterile oil or other vehicles suitable for subcutaneous or intramuscular injection.

EXAMPLE 1

*Preparation of 4-amino-6-chloropyrimidine*

To 1.2 liters of freshly distilled phosphorus oxychloride were added 110 g. of 4-amino-6-hydroxypyrimidine prepared according to the method of Brown, Chem. and Ind., 69, page 355 (1950). The mixture was shaken thoroughly and 160 g. of freshly distilled N-N-diethylaniline were added thereto. The reaction mixture was then heated to refluxing under anhydrous conditions for about five hours. The excess phosphorus oxychloride was then removed by distillation in vacuo at about the pressure of 15 mm. of mercury. A brown syrupy residue remained, containing the 4-amino-6-chloropyrimidine formed in the reaction. The residue was cooled and dissolved in about 400 ml. of anhydrous ether and the ether solution was cautiously poured over about 800 g. of crushed ice contained in a flask immersed in a Dry Ice-alcohol cooling bath. The mixture was stirred whereupon the product dissolved and the excess phosphorus oxychloride contained in the residue was hydrolyzed. While continuing cooling, small portions of concentrated ammonium hydroxide solution were carefully added until the mixture reached a pH in the range of about 5–5.5. The resulting solution was subjected to continuous extraction with ether and the ether extract thus obtained was evaporated to dryness in vacuo. The residue, consisting of crude 4-amino-6-chloropyrimidine was dissolved in about 3.5 liters of hot water and decolorized with activated carbon. On cooling, crystals of 4-amino-6-chloropyrimidine formed, were removed by filtration and dried. About 84 g. of product were obtained, melting at about 215° C.

EXAMPLE 2

*Preparation of 4-amino-6-benzylaminopyrimidine*

A mixture of 10 g. of 4-amino-6-chloropyrimidine and 17 g. of benzylamine was heated at about 100° C. for about forty-eight hours. The resulting solid precipitate was removed by filtration and cooled. The collected precipitate was suspended in about 100 ml. of hot water and refiltered. The washed solid was crystallized from 50 percent ethanol. About 12 g. of 4-amino-6-benzylaminopyrimidine were obtained, melting at about 210° C.

EXAMPLE 3

*Preparation of 4-amino-6-benzylaminopyrimidine dihydrochloride*

A solution was prepared by dissolving 2 g. of 4-amino-6-benzylaminopyrimidine in 100 ml. of warm ethanol.

The solution was cooled and dry hydrogen chloride gas was bubbled through the liquid until saturated. The solution was permitted to stand for a few hours in a refrigerator, whereupon 4-amino-6-benzylaminopyrimidine dihydrochloride crystallized and precipitated from solution. The dihydrochloride salt was removed by filtration and recrystallized from warm ethanol.

About 2.2 g. of white crystalline 4-amino-6-benzylaminopyrimidine dihydrochloride were obtained, melting at about 164–165° C.

EXAMPLE 4

Preparation of 4-amino-6-anilinopyrimidine

A solution of 6 g. of 4-amino-6-chloropyrimidine and 6 g. of aniline hydrochloride in 75 ml. of water was heated under reflux for about forty-eight hours. The cooled solution was made basic by the addition of concentrated ammonium hydroxide solution, whereupon a crystalline precipitate of 4-amino-6-anilinopyrimidine was formed. After recrystallizing three times from 50 percent aqueous ethanol, 2 g. of product were obtained, melting at about 176° C.

EXAMPLE 5

Preparation of 4-amino-6-phenethylaminopyrimidine

A mixture of 10 g. of 4-amino-6-chloropyrimidine, 13 g. of phenethylamine and 100 ml. of water was refluxed for about sixteen hours. The reaction mixture was treated with concentrated ammonium hydroxide solution until weakly basic and cooled whereupon the 4-amino-6-phenethylaminopyrimidine formed in the reaction crystallized. The crystals were cooled, washed with water and recrystallized from a minimum amount of warm 50 percent aqueous ethanol.

4 - amino - 6 - phenethylaminopyrimidine thus prepared melted at about 163–164° C.

When phenylpropylamine was used instead of phenethylamine, 4-amino-6-phenylpropylaminopyrimidine was formed, which melted at about 106–107° C. after recrystallization from aqueous ethanol.

EXAMPLE 6

Preparation of 4-amino-6-n-butylaminopyrimidine

A mixture of 10 g. of 4-amino-6-chloropyrimidine, 14 g. of n-butylamine and 100 ml. of water was refluxed for about sixteen hours. The reaction mixture was concentrated by evaporation under reduced pressure to about one-half of its original volume, whereupon the 4-amino-6-n-butylaminopyrimidine which was formed in the reaction crystallized on cooling. The crystalline product was removed by filtration and recrystallized from 50 percent ethanol-water mixture. About 10 g. of 4-amino-6-n-butylaminopyrimidine melting at about 117–118° C. were obtained.

EXAMPLE 7

The procedure of Example 6 was followed, except that other monoalkylamines were used in place of n-butylamine. The following table sets forth the alkylamine used, and the melting point of the resulting 4-amino-6-alkylamino substituted pyrimidine.

TABLE 1

| Alkylamine | Product | Melting Point, °C. |
|---|---|---|
| Isobutylamine | 4-Amino-6-isobutylaminopyrimidine | 124–125 |
| Isoamylamine | 4-Amino-6-isoamylaminopyrimidine | 144–145 |
| Amylamine | 4-Amino-6-amylaminopyrimidine | 114–115 |
| Hexylamine | 4-Amino-6-hexylaminopyrimidine | 114–115 |
| Heptylamine | 4-Amino-6-heptylaminopyrimidine | 118 |

EXAMPLE 8

Preparation of 4-amino-6-β-phenoxyethylaminopyrimidine

A mixture of 10 g. (0.08 mol) of 4-amino-6-chloropyrimidine and 24.6 g. (0.16 mol) of β-phenoxyethylamine was heated at about 120° C. for about forty-eight hours. The reaction mixture was dissolved in warm 50 percent aqueous ethanol, treated with decolorizing carbon, filtered and the clarified solution cooled. A crystalline precipitate of 4-amino-6-β-phenoxyethylaminopyrimidine was formed, and was collected, washed with water and dried. After recrystallization from 50 percent aqueous ethanol, the 4-amino-6-β-phenoxyethylaminopyrimidine thus prepared melted at about 189–190° C.

EXAMPLE 9

Preparation of 4-amino-6-p-toluidinopyrimidine

The procedure of Example 8 was followed, except that about 0.16 mol of p-toluidine was used.

The 4-amino-6-p-toluidinopyrimidine thus prepared melted at about 173–175° C.

When m-toluidine was used in place of p-toluidine, 4-amino-6-m-toluidinopyrimidine melting at about 131° C. was obtained.

EXAMPLE 10

Preparation of 4-amino-6-p-chloroanilinopyrimidine

The procedure of Example 8 was repeated, except that 0.16 mole of p-chloroaniline was used.

The 4-amino-6-p-chloroanilinopyrimidine thus prepared melted at about 196–197° C.

EXAMPLE 11

Preparation of 4-amino-6-piperidinopyrimidine

The procedure of Example 8 was repeated, except that 0.16 mol of piperidine was used.

After recrystallization from warm aqueous ethanol, the 4-amino-6-piperidinopyrimidine thus prepared melted at about 185–186° C.

EXAMPLE 12

Preparation of 4-amino-6-β-pyridylmethylaminopyrimidine

The process of Example 8 was followed, except that 0.16 mol of β-pyridylmethylamine was used.

The 4-amino-6-β-pyridylmethylaminopyrimidine thus prepared melted at about 187–188° C.

EXAMPLE 13

Preparation of 4-amino-6-m-methylbenzylaminopyrimidine

The procedure of Example 8 was repeated, except that 0.16 mol of m-methylbenzylamine was used.

After recrystallization from aqueous ethanol, the 4-amino-6-m-methylbenzylaminopyrimidine thus prepared melted at about 170–171° C.

EXAMPLE 14

Preparation of 4-amino-6-cyclohexylaminopyrimidine

The procedure of Example 8 was followed, except that about 0.16 mol of cyclohexylamine was used.

The 4-amino-6-cyclohexylaminopyrimidine thus prepared melted at about 202–203° C.

EXAMPLE 15

Preparation of 4-amino-6-α-furfurylaminopyrimidine

The procedure of Example 8 was employed, except that about 0.16 mole of α-furfurylamine was used.

The 4-amino-6-α-furfurylaminopyrimidine thus prepared melted at about 171° C.

EXAMPLE 16

*Preparation of 4-amino-6-phenylsulfonylaminopyrimidine*

To 11 g. (0.1 mol) of powdered 4,6-diaminopyrimidine prepared according to the method of J. D. Brown, J. Soc. Chem. and Ind. 69:355 (1950) were added 8 g. (0.1 mol) of dry pyridine and 20 g. (0.1 mol) of benzenesulfonyl chloride. The warm mixture was heated on the steam bath for an hour and then cooled. The resulting solid mass was slurried with water and filtered, and the filter cake, comprising 4-amino-6-phenylsulfonylaminopyrimidine, was washed with cold ethanol. The 4-amino-6-phenylsulfonylaminopyrimidine thus prepared was recrystallized from ethanol and had no definite melting point, but decomposed with charring upon continued heating.

EXAMPLE 17

*Preparation of salts of 4-amino-6-p-toluidinopyrimidine*

A solution is prepared by dissolving 2 g. (0.01 mol) of 4-amino-6-p-toluidinopyrimidine, prepared according to the method of Example 9, in 50 ml. of warm ethanol. To the solution are added 50 ml. of ethanol containing dissolved therein 0.6 g. (0.01 mol) of acetic acid. The mixture is permitted to stand at room temperature for about thirty minutes while stirring, and then is evaporated to dryness in vacuo. The residue, comprising 4-amino-6-p-toluidinopyrimidine acetate, is recrystallized by dissolving it in the minimum amount of warm ethanol followed by the addition of anhydrous ether until slight turbidity of the solution is noted. On standing, the acetate salt crystallizes.

By following the same procedure, except that the equivalent amounts of phosphoric, propionic, citric, maleic, nitric and salicylic acids are used, there are obtained, respectively, the phosphoric acid, propionic acid, citric acid, maleic acid, nitric acid and salicylic acid addition salts of 4-amino-6-p-toluidinopyrimidine.

In the same manner there can be prepared the corresponding acid addition salts of the other compounds disclosed herein and illustrated by Examples 2, 4–8 and 10–16, inclusive.

We claim:

1. A compound selected from the group consisting of a base and acid addition salts thereof, said base being represented by the formula

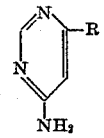

wherein R represents a member of the group consisting of alkylamino radicals having from 4 to 7 carbon atoms, and anilino, p-toluidino, m-toluidino, β-phenoxyethylamino, benzylamino, p-chlorophenylamino, γ-phenyl-n-propylamino, m-methylbenzylamino, phenethylamino, cyclohexylamino, phenylsulfonylamino, α-furfurylamino, N-piperidino and β-pyridylmethylamino radicals.

2. 4-amino-6-phenethylaminopyrimidine.
3. 4-amino-6-anilinopyrimidine.
4. 4-amino-6-p-toluidinopyrimidine.
5. 4-amino-6-β-phenoxyethylaminopyrimidine.
6. 4-amino-6-benzylaminopyrimidine.

References Cited in the file of this patent

Maggiolo et al.: J. Am. Chem. Soc., vol. 73, pages 106–107 (1951).